Figure 2:
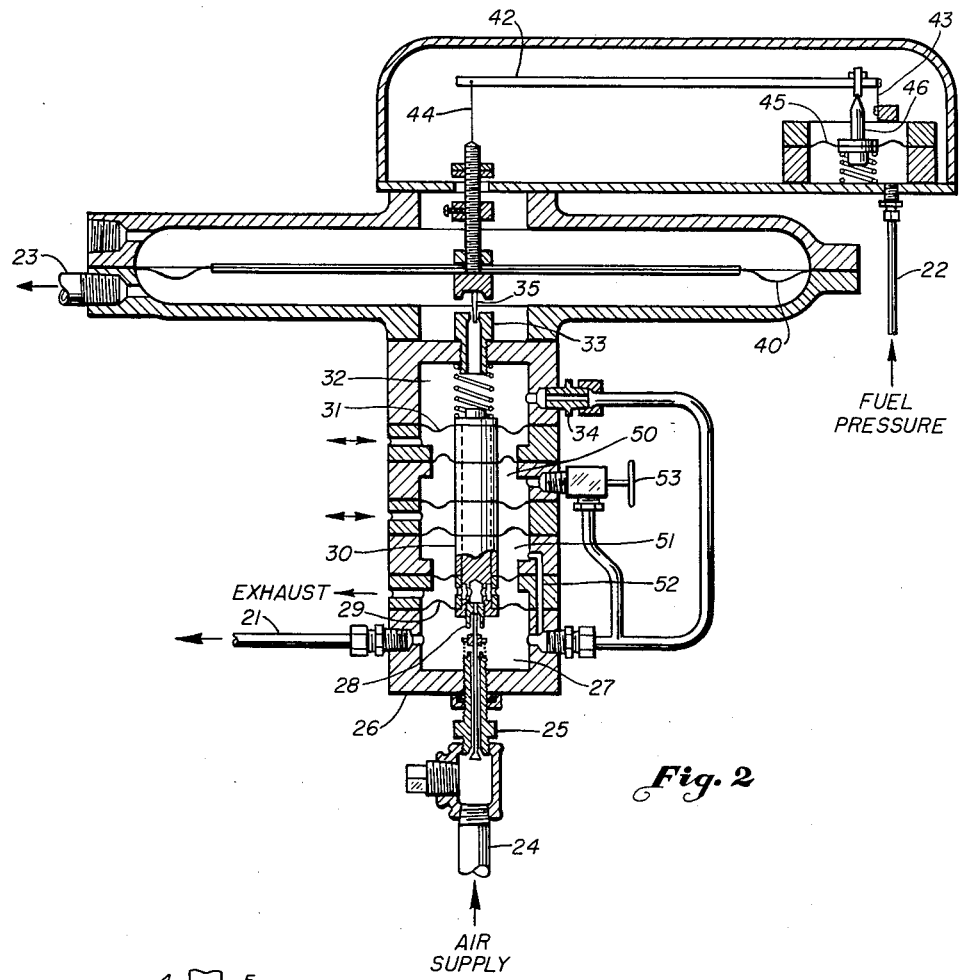

Nov. 24, 1964   R. P. DUNCAN   3,158,320
COMBUSTION CONTROL SYSTEM
Filed Aug. 3, 1962

INVENTOR.
ROBERT P. DUNCAN

United States Patent Office 3,158,320
Patented Nov. 24, 1964

3,158,320
COMBUSTION CONTROL SYSTEM
Robert P. Duncan, 5807 S. Louisville, Tulsa, Okla.
Filed Aug. 3, 1962, Ser. No. 214,696
5 Claims. (Cl. 236—15)

The present invention relates to the control of the negative furnace pressure of a heater burning fluid fuel under pressure. More specifically, the invention relates to the apparatus with which the natural draft of a process heater is adjusted quickly, accurately and dependably as demand changes on the combustion.

Most natural draft process heaters are operated today with only manual control of combustion air. There are systems available for the control of air and fuel to the combustion of these heaters. Many ways of sensing air flow and the flow of many types of fuel have been developed in this art. However, all practical systems and components on the market today are too complex to be as dependable as generally desired. Further, the response of these complex systems to draft in the order of 0.05 to 0.5 inch of water is not satisfactory.

A primary object of the present invention is to provide a simple, compact system responsive to fuel pressure and draft to control the amount of draft needed for combustion of the fuel.

Another object is to provide a control system which is sensitive enough to regulate the draft of a furnace between 0.05 inch and 0.5 inch of water negative pressure.

Another object is to provide a control system which is automatic in controlling draft and which will increase the negative pressure to a maximum upon failure of power to the system.

Another object is to provide a cleaning purge of air for the connection with which the system senses draft to prevent plugging of the connection by foreign matter from within the furnace.

The invention contemplates a control system with which the method of control is practiced being embodied within a single, unitized housing. The apparatus so housed is provided with instrument air pressure as a source of power, is connected to sense fuel pressure and furnace pressure directly, develops a control pressure without materially loading the system responding to a fuel and draft, and uses this control pressure to develop a pilot pressure to apply directly to the damper in setting its position for the regulation of the draft. This compact, unitized apparatus has all of its internal mechanical connections made with some flexible type joint or through a pointed push rod to avoid friction as the parts move relative to each other. Both the employment of a control pressure between the fuel and draft sensing system and the pilot relay system gives a very sensitive response to draft and fuel pressure changes and regulation of draft with the output of the pilot relay system.

The invention also contemplates that the output control pressure of the system will position the damper of the combustion air so the damper will open automatically in the event the power to the system should fail.

The invention also contemplates air from the power supply being routed within the instrument so as to exhaust from the control system through the connection made between the instrument and the furnace draft connection. The constant flow of this instrument air, in the proper direction, prevents dirt and other foreign matter within the furnace from entering the instrument.

Figure 1:
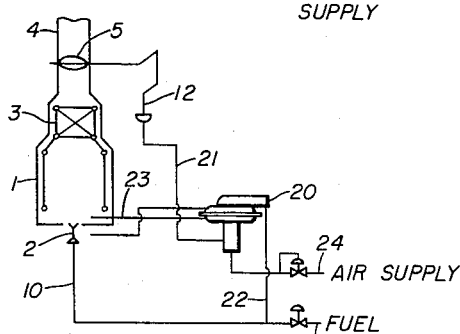

Other objects, advantages and embodiments of the present invention will become readily apparent from the following detailed description of the preferred embodiment of the invention with specific reference to the accompanying drawings in which:

FIG. 1 is diagrammatic representation of a furnace with an indication of how the preferred embodiment of my invention is connected to the furnace; and FIG. 2 is a sectioned elevation of the preferred embodiment of my invention as it is connected to the furnace of FIG. 1.

Referring to the drawings, FIG. 1 illustrates, quite diagrammatically, the general relation of my invention to a furnace in which fluid fuel is burned and through which the flow of combustion air is controlled. The outline of a furnace 1 is shown. A burner 2 is indicated, near the bottom of furnace 1. The air for combustion flows up, around burner 2, and if there is any portion of the air not actually used to combine with fuel, this air and the products of combustion are both conducted over the convection section 3 of the process furnace. As these gases flow up, out stack 4, their flow rate is regulated by the position of damper 5.

The flow of fuel to burner 2 is regulated in conduit 10 by the position of valve 11. A demand system, not shown, is pressured to adjust the position of valve 11. Of course, valve 11 could be manually controlled.

The flow of heated gas through furnace 1 is regulated by the position of damper 5 in stack 4. Any well-known power operator 12, responsive to the output control pressure from my control unit, can be used to actually move damper 5 to various positions as required to properly regulate the draft of furnace 1 when the fuel flow to burner 2 is changed. In general, an increase in fuel flow through conduit 10 requires an increase in air flow through furnace 1. My invention is embodied in a compact, unitary, sensitive, readily adjusted, dependable apparatus for carrying out my concepts of a method for controlling the draft of the process furnace 1.

The apparatus with which I carry out my method of control is indicated at 20. The output control pressure is applied to damper operator 12 through pipe 21. To develop the desired value of output control pressure, my unit 20 is made responsive to the pressure of fuel in conduit 10 by pipe 22 and furnace pressure by pipe 23. These variables of combustion within furnace 1 utilize the power of instrument air supply from pipe 24 to develop the control pressure output in pipe 21. The method followed in this utilization of instrument air by fuel pressure and furnace draft, and the apparatus carrying out this method, include my invention.

My invention has now been generally oriented structurally to the specific combustion process it is intended to control, or regulate. The unit 20, embodying my invention, is shown in greater detail by the use of FIG. 2. This sectioned elevation of FIG. 2 illustrates a fairly specific form for its components and their relationship in developing the output control pressure from the instrument air supply. Obviously, variations from these forms and their relationships, to a degree, will still fall within the scope of my invention.

Output Control Relay

In FIG. 2 the pipe 24 for the supply of instrument air is indicated as connected to bottom intake valve 25. Intake valve 25 is a part of the assembly in the lower portion of the housing 20 which shall be referred to as the output control relay 26. The importance of relay 26 is in the fact that it is here the signal to the damper operator 12 is developed. This is the ultimate result of my invention, to develop a pressure from the supply of pipe 24 which will regulate the position of damper 5—control the draft of furnace 1. Intake valve 25 flows instrument air into housing chamber 27. Exhaust valve 28 controls discharge of this air from chamber 27. Pipe 21 conveys whatever pressure is developed in chamber 27 by these two valves to operator 12. Additional details of these valves, their cooperation and actuation, will be described infra.

The top wall of chamber 27 is defined by a flexible diaphragm 29. Although exhaust valve 28 is mounted on this diaphragm 29, for the moment, the diaphragm post 30 is to be noted in its function as a single mechanical connection between diaphragm 29 and diaphragm 31. Diaphragm 31 is the movable wall of control chamber 32. Therefore, the relative pressures in control chamber 32 and output chamber 27 basically determine the movement of post 30, the actuation of intake valve 25 and exhaust valve 28. The movement of post 30 is initiated by a change in the control pressure in chamber 32. The actuation of valves 25 and 28 establish the output pressure in chamber 27. The cycle ends with a balance of the chamber forces on post 30.

Control Chamber 32

Chamber 32 is termed the control chamber because it is the change of pressure in this chamber which dominates the valve actuation of output chamber 27 to give the desired action by the system. The pressure in this control chamber 32 is regulated by a valve 33, mounted in the top, fixed wall of chamber 32. This valve 33, mounted in the wall of chamber 32 provides some of the unique compactness of my unit which distinguishes it over prior art systems.

A supply of instrument air is fed into chamber 32 through an orifice 34. The air flows in through the orifice 34 and out through the seat of control valve 33. Conveniently, and compactly, orifice 34 is supplied from output chamber 27; however, the supply could be derived from pipe 24 directly if desired. The basic objective is to establish a supply of air for chamber 32 and regulate the discharge from chamber 32, through the seat of control valve 33, by valve element 35.

Draft Diaphragm

Control valve element 35 is a very important movable element in my system. It is the movement of this element 35 which changes the pressures in chambers 27 and 32 and, therefore, the position of damper 5. To move this element, I have attached it to diaphragm 40.

Draft diaphragm 40 is subjected to two forces, the furnace pressure and the fuel pressure. When these forces are unbalanced, diaphragm 40 moves. When diaphragm 40 moves, control valve element 35 moves; the results of this movement have been explored. The positioning of damper 5 adjusts the furnace pressure to balance the forces on diaphragm 40.

The first force on diaphragm 40 is the negative value of the furnace draft. Pipe 23 brings this pressure into the housing 41 of diaphragm 40. The other side of the diaphragm 40 is connected to atmosphere. This arrangement places the furnace draft connection pipe 23 on the same side of diaphragm 40 as the control valve 33. The exhaust of air from valve 33 is flowed from under diaphragm 40, through pipe 23 and into the furnace.

The uniqueness of this combination of valve 33, diaphragm 40 and draft connection 23 gives a continuous purge of pipe 23. Consider the solid particles in the products of combustion, the fire brick dust, all dirt and debris, and any foreign matter which could collect in pipe 23. All this plugging material is positively isolated from pipe 23 because of the continuous purge my particular combination provides by placing the control valve 33 between control chamber 32 and diaphragm 40.

Draft-Fuel Pressure Beam

Diaphragm 40 has been considered as it is subjected to two forces, the first force being the negative furnace draft and the second force being fuel pressure. The diaphragm 40 is to also be consided as generating one of the forces applied to position a pivoted beam 42.

Beam 42 is a simple, elongated member. However, it is pivoted from a flat, flexible leaf at one end and the forces generated from furnace draft and fuel pressure applied to the beam at points arranged on one side of the pivot. Moreover, the forces are applied to the beam without friction.

More specifically, beam 42 is pivoted at flat, flexible leaf 43, mounted on the right end as viewed in FIG. 2. On the left hand end of beam 42, diaphragm 40 is tied to the beam by cable 44. A diaphragm 45 is subjected to fuel pressure by pipe 22 and has a pointed rod 46 mounted at the center of the diaphragm and arranged to bear on beam 42 between flat, flexible leaf pivot 43 and cable 44. With the negative value of furnace draft pulling down and the fuel pressure pushing up, beam 42 is held in a fixed position about pivot 43 when the moment of these forces are balanced on the beam.

One side (the underside) of diaphragm 45 is exposed directly to fuel pressure; the other side to atmospheric pressure. One side (the underside) of diaphragm 40 is exposed directly to furnace draft; the other side to atmospheric pressure. The force on each diaphragm is proportional to the flow of the medium (air flow, fuel flow) to which it is exposed. The forces are also proportional to each other. The linkage system between the diaphragms and beam 42 compares these forces directly with no spring bias to cut down on the sensitivity of their response to each other.

Operating Sequence

Although all the structural details of my embodiment have not been described, the basic arrangement is understandable; at least enough to support a general description of the operation.

The system is considered to be in balance. Then the demand for more heat is applied to fuel valve 11. Valve 11 is opened and the fuel pressure in conduit 10 and pipe 22 increases. Fuel pressure diaphragm 45 lifts, raising pointed rod 46 to increase the upward force on beam 42. Cable 44 is pulled upward, raising attached diaphragm 40 and connected control valve element 35 out of the seat of control valve 33.

The control pressure in chamber 32 decreases, and the resulting unbalance of forces on diaphragm post 30 causes the post to move upward. Intake valve 25 closes and exhaust valve 28 opens. The pressure in relay chamber 27 decreases. The output pressure in chamber 27 and pipe 21 decreases, and the operator 12 is arranged to respond by opening damper 5 further. This opening of damper 5 increases the negative value of the furnace pressure, increases the air required for the increase in fuel.

As for my control system, the increase in negative furnace draft forces diaphragm 40 downward with a force to balance the force of the fuel pressure exerted on the beam 42. Control valve element 35 is repositioned, the pressure in chamber 32 is adjusted, diaphragm post 30 actuates valves 28 and 25 to adjust the output pressure of chamber 27 and pipe 21 to balance the control unit.

Pivot Structure

Having outlined the structure of my embodiment, and its overall operation, I would like to direct attention to the unique pivot system which imparts a very low order of friction to the movement of the parts of my embodiment. The diaphragms attached to post 30 give very little friction. Diaphragm 40 also gives little friction to the system. The same is true of diaphragm 45. The only other possible sources of mechanical friction are in the connections to beam 42.

Granted, the position-balance with beam 42 as a center is broadly similar to other systems in the prior art. However, consider the three connections between beam 42 and the other units of the system. They are all deliberately designed to impart a very little friction to the beam movement.

The connections are, specifically, flat, flexible leaf 43 and cable 44 and the point contact of rod 46. Each of these connections are different in form, yet each transmits to and from beam 42 efficiently. The result is a high degree of sensitivity for the complete system. The very low order of draft forces are almost immediately effectively in starting the cycle of adjustment in the unit to changes.

*Control Chamber 32 as a Fluid Pressure Link*

I have described how the pressure within chamber 32 moves post 30 and establishes the output pressure in chamber 27. The position of beam 42 could have been transduced into the chamber 32 pressure in many different ways. However, I have provided a unique arrangement by mounting valve 33 directly in the fixed wall of chamber 32 and cooperating valve element 35, connected to beam 42, with the seat of the valve.

This arrangement gives, essentially, no mechanical friction between beam 42 and valve 33. Valve element 35, attached to diaphragm 40, is simply moved into and out of the seat of valve 33 to establish the rate of bleed out of chamber 32 and, therefore, the pressure in chamber 32. Obviously this type of connection between the position balance system of beam 42 and output control relay is very sensitive. The pressure of chamber 32 becomes the force link between the two halves of the system with both simplicity and effectiveness. The position of valve 33 has been described supra as having a unique position in that its discharge can function to purge the pipe 23. Now the advantage of providing a compact, frictionless connection in the system adds another feature to the embodiment of my invention.

*Reset*

While analyzing the relationship between chamber 32 and the output control relay, the function of chambers 50 and 51 can be considered. When the output pressure in chamber 27 is developed, passage 52 applies this pressure to chamber 51 which develops a force on post 30 from two unequal diaphragm areas. This force is applied upward to post 30.

At the same time, the fluid pressure in chamber 27 is applied to chamber 50 through needle valve 53. The unequal diaphragm areas in chamber 50 develop a force on post 30 in opposition to the force of chamber 51. Needle valve 53 restricts the flow of pressure fluid in or out of chamber 50. Changing the setting of needle valve 53 changes the time it takes for the chamber 27 output to equal the immediate demand when a change occurs. This avoids hunting and stabilizes the system.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpretated as illustrative and not in a limiting sense.

The invention having been described, what is claimed is:

1. Apparatus for the control of combustion including,
   a first housing portion,
   a first pressure sensitive diaphragm mounted in the first housing portion and subjected directly to the fuel supplied the combustion so as to respond to the full pressure of the fuel,
   a pivoted beam mounted in the first housing portion and connected to the first pressure sensitive diaphragm so the beam will pivot in one of two directions by the force generated by the full fuel pressure applied to the pressure sensitive diaphragm,
   a second housing portion mounted on the first housing portion,
   a second pressure sensitive diaphragm mounted in the second housing portion as one wall of a pressure chamber in the housing portion that is connected to the combustion chamber by a passage which conveys discharge air from a control chamber to the combustion chamber whereby the pressure on the diaphragm is substantially equal to the combustion chamber pressure,
   a movable control valve element connected to the second pressure sensitive diaphragm,
   a mechanical connection extending through aligned openings in the first and second housing portions between the second pressure sensitive diaphragm and the beam to pivot the beam in the second of the two directions by the force of the pressure in the combustion chamber,
   a third housing portion mounted on the second housing portion,
   a control chamber in the third housing portion,
   a supply of air connected to the control chamber,
   a fixed wall of the control chamber with an orifice therethrough receiving the movable control valve element to regulate the discharge of air from the control chamber,
   a movable wall of the control chamber moving in response to the pressure established by the movable control valve element position in the orifice,
   a relay mounted in the third housing portion and connected to the movable wall of the control chamber to establish an output air pressure,
   and a control apparatus for the flow of combustion air connected to the relay and positioned by the output of the relay.

2. Apparatus for the control of furnace draft including,
   a unitary housing;
   a beam mounted from one of its ends in the housing by a flat and flexible leaf member;
   a first diaphragm mounted in the housing and having a pointed push rod mounted from the center of the diaphragm so as to bear on the beam at a point intermediate its ends and pivot the beam in one direction, the diaphragm being connected to the fuel supply so as to be directly responsive to the pressure of fuel supplied the combustion;
   a second pressure sensitive diaphragm mounted in the housing as one wall of a pressure chamber in the housing, the pressure chamber being connected to the combustion chamber by a passage which conveys discharge air from a control valve to the combustion chamber whereby the pressure on the diaphragm is substantially equal to the combustion chamber pressure, a flexible connection between the second diaphragm and the other end of the beam in order to pivot the beam in the other direction, an air supply;
   a chamber in the housing which is connected to the air supply;
   a control valve mounted in a fixed wall of the chamber housing and arranged to have its movable element operated by the second diaphragm to establish a control pressure in the chamber from the air supply connected to the chamber;
   a third diaphragm mounted in the housing as a movable wall of the chamber to thereby respond by positioning in accordance with the control pressure;
   a relay mounted in the housing and supplied from the air supply and positioned by the third diaphragm to establish an output air pressure;
   and a damper controlling the furnace draft by being positioned with the output air pressure from the relay.

3. A unitary apparatus for the control of furnace draft including,
- a housing,
- a supply of instrument air,
- a relay mounted in the housing and connected to the instrument air supply and actuated to establish an output air pressure,
- a damper mounted where it will control furnace draft and positioned by the output air pressure established by the relay mounted in the housing,
- a control diaphragm mounted in the housing as a movable wall of a chamber in the housing and mechanically connected to the relay to actuate the relay,
- a control valve mounted in a fixed wall of the chamber in the housing and also connected to the supply of instrument air and establishing a control air pressure in the chamber and on the diaphragm,
- a beam connected to the movable element of the control valve and pivoted in the housing about a leaf spring to position the movable element,
- a first diaphragm mounted in the housing and connected to the beam through a connection substantially free of friction and directly responsive to fuel pressure,
- and a second pressure sensitive diaphragm mounted in the housing as one wall of a pressure chamber that is connected to the combustion chamber of the furnace by a passage which conveys discharge air from the control valve whereby the pressure on the second pressure sensitive diaphragm is substantially equal to the pressure in the combustion chamber of the furnace, the second pressure sensitive diaphragm being mechanically connected to the beam through a connection substantially free of friction to cause the beam to pivot and result in the relay establishing an output air pressure which is applied to move the damper and cause the draft to follow the changes in the fuel pressure quickly and accurately.

4. Unitary apparatus for the control of combustion air flow in proportion to fuel flow in a furnace including,
- a housing,
- a first diaphragm mounted within the housing and connected to a fuel supply so as to respond with its first side to pressure of the fuel as the fuel flows to combustion in the furnace and with its second side to atmospheric pressure,
- a second pressure sensitive diaphragm mounted within the housing as one wall of a pressure chamber in the housing that is connected to the combustion chamber of the furnace by a passage which conveys discharge air from a control chamber to the combustion chamber whereby the pressure on the diaphragm is substantially equal to the combustion chamber pressure,
- a pivoted beam connecting the first diaphragm to the second diaphragm so as to pivot in accordance with the forces exerted by the differential between the fuel and atmospheric pressures and the furnace and atmospheric pressures,
- a needle valve element connected to the first side of the diaphragm,
- a seat orifice mounted in a fixed wall of a control chamber within the housing and positioned so as to cooperate with the needle valve element in establishing a control pressure in the control chamber by regulating the exhaust of supply air from the control chamber and from the seat orifice and through the passage with which pressure of the combustion chamber of the furnace is brought to the second diaphragm,
- a relay mounted within the housing and also supplied air and operated by the control pressure established by the needle valve and orifice cooperation,
- and a damper control for the furnace draft connected to the relay output, whereby the differential between atmospheric and furnace pressure is controlled to properly correlate with the differential between fuel pressure and atmospheric pressure in regulating combustion air flow in proportion to fuel flow.

5. A unitary apparatus with which furnace draft is controlled including,
- a unitary housing,
- a supply of instrument air,
- a relay mounted within the housing and connected to the supply and actuated through a mechanical connection to establish an output air pressure,
- a damper connected to the furnace to control draft in the furnace by its position and connected to the relay so its position will be controlled by the output air pressure of the relay,
- an air pressure sensitive control chamber established within the housing and having a movable wall of the chamber connected to the mechanical connection of the relay, the chamber being connected to the supply of instrument air,
- a control valve mounted in a second wall of the control chamber to regulate the exhaust of instrument air supplied the chamber,
- a pressure sensitive diaphragm mounted in the housing as one wall of a pressure chamber in the housing that is connected to the combustion chamber of the furnace by a passage which conveys discharge air from the control valve to the combustion chamber whereby the pressure on the diaphragm is substantially equal to the combustion chamber pressure,
- a mechanical connection between the movable element of the control valve and the diaphragm,
- means responsive to fuel pressure for furnace combustion,
- and a beam connected to the diaphragm by a flexible member and arranged to pivot by the means responsive to fuel pressure to oppose the force generated on the diaphragm by the pressure of the combustion chamber of the furnace,
- whereby an increase in fuel pressure will cause the beam to pivot and the control valve to decrease the instrument air pressure in the control chamber and decrease the output air pressure from the relay which will position the damper so air of combustion to the furnace will increase.

References Cited by the Examiner

UNITED STATES PATENTS

| | | | |
|---|---|---|---|
| 1,046,922 | 12/12 | Williams | 236—156 X |
| 1,576,754 | 3/26 | McLean | 236—15 |
| 2,212,606 | 8/40 | Klinker | 236—14 X |
| 2,258,366 | 10/41 | Otto | 236—82 |
| 2,312,251 | 2/43 | Johnson | 236—80 |
| 2,349,329 | 5/44 | Anderson | 236—15 |
| 2,586,503 | 2/52 | Barnard | 236—15 |
| 2,946,509 | 7/60 | Radtke et al. | 236—87 |

FOREIGN PATENTS 277,224   9/27   Great Britain.

EDWARD J. MICHAEL, *Primary Examiner.*
ALDEN D. STEWART, *Examiner.*